(12) United States Patent  
Lee

(10) Patent No.: US 11,797,046 B2  
(45) Date of Patent: Oct. 24, 2023

(54) ELECTRONIC DEVICE

(71) Applicant: Samsung Display Co., Ltd., Yongin-si (KR)

(72) Inventor: Jiheon Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 32 days.

(21) Appl. No.: 17/480,695

(22) Filed: Sep. 21, 2021

(65) Prior Publication Data

US 2022/0261034 A1    Aug. 18, 2022

(30) Foreign Application Priority Data

Feb. 15, 2021    (KR) .................... 10-2021-0019950

(51) Int. Cl.
*G06F 1/16* (2006.01)
(52) U.S. Cl.
CPC .......... *G06F 1/1616* (2013.01); *G06F 1/1656* (2013.01); *G06F 1/1681* (2013.01)
(58) Field of Classification Search
CPC .... G06F 1/1616; G06F 1/1656; G06F 1/1681; G06F 1/1641; G06F 1/1652; G06F 2203/04102; G09F 9/301
See application file for complete search history.

(56) References Cited

U.S. PATENT DOCUMENTS

| | | | |
|---|---|---|---|
| 10,021,795 B2 * | 7/2018 | Hsu ..................... | H04M 1/0216 |
| 10,063,677 B2 * | 8/2018 | Cavallaro ............. | G06F 1/1652 |
| 10,143,098 B1 * | 11/2018 | Lee ......................... | E05D 11/06 |
| 10,420,233 B2 * | 9/2019 | Lee ......................... | G06F 3/041 |
| 10,599,189 B1 * | 3/2020 | Hsu ....................... | G06F 1/1681 |
| 10,678,305 B1 * | 6/2020 | Lee ........................ | G06F 1/1652 |
| 10,761,572 B1 * | 9/2020 | Siddiqui ............... | G06F 1/1681 |
| 10,834,814 B2 * | 11/2020 | Cho ...................... | H05K 5/0226 |
| 10,925,176 B2 * | 2/2021 | Lee ....................... | G06F 1/1652 |
| 11,334,122 B2 * | 5/2022 | Hsu ....................... | F16C 11/04 |
| 11,334,123 B2 * | 5/2022 | Kim ...................... | E05D 3/122 |
| 2017/0272559 A1 * | 9/2017 | Cavallaro ............. | G06F 1/1681 |
| 2018/0092223 A1 * | 3/2018 | Hsu ..................... | H04M 1/0216 |
| 2018/0242446 A1 * | 8/2018 | Cho ..................... | H05K 1/0281 |

(Continued)

FOREIGN PATENT DOCUMENTS

| KR | 10-2018-0076271 | 7/2018 |
|---|---|---|
| KR | 10-2020-0101239 | 8/2020 |

*Primary Examiner* — Anthony M Haughton
*Assistant Examiner* — Theron S Milliser
(74) *Attorney, Agent, or Firm* — KILE PARK REED & HOUTTEMAN PLLC

(57) ABSTRACT

An electronic device includes a display panel and a folding module disposed below the display panel. The folding module includes a first support member, a second support member, a first hinge slidably coupled to the first support member, a second hinge slidably coupled to the second support member, a first multi joint body coupled to the first support member, a second multi joint body spaced apart from the first multi joint body in a first direction and coupled to the second support member, and a central joint disposed between the first multi joint body and the second multi joint body. The central joint is coupled to the first multi joint body and the second multi joint body, and overlaps at least a portion of the first multi joint body and at least a portion of the second multi joint body in a plan view.

21 Claims, 9 Drawing Sheets

(56) References Cited

U.S. PATENT DOCUMENTS

2019/0069421 A1* 2/2019 Lee ................. H05K 5/0017
2019/0380219 A1* 12/2019 Lee ................. H05K 5/0017
2020/0166969 A1* 5/2020 Lee ................. H04M 1/0268
2020/0267859 A1 8/2020 Kim et al.
2020/0383217 A1* 12/2020 Kim ................. G06F 1/1681

* cited by examiner

ELECTRONIC DEVICE

CROSS-REFERENCE TO RELATED APPLICATION(S)

This application claims priority to and benefits of Korean Patent Application No. 10-2021-0019950 under 35 U.S.C. § 119, filed on Feb. 15, 2021, in the Korean Intellectual Property Office, the entire contents of which are incorporated herein by reference.

BACKGROUND

The disclosure herein relates to a foldable electronic device.

Electronic devices, such as smart phones, digital cameras, laptop computers, navigation units, and smart televisions, for providing an image to a user include a display device for displaying the image. The display device generates an image and provides the image to the user through a display screen.

Recently, with the technological development for the display device, various types of display devices have been developed. For example, flexible display devices which are bendable, foldable, or rollable in a curved shape have been developed. Flexible display devices, which can change shapes in many ways, may be easy to carry and improve user's convenience.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides an electronic device in which deformation of a folding area of a display layer may be reduced by relieving stress of the folding area.

In an embodiment, an electronic device may include: a display panel including a first non-folding area, a second non-folding area spaced apart from the first non-folding area in a first direction, and a folding area disposed between the first non-folding area and the second non-folding area; and a folding module disposed below the display panel. The folding module may include: a first support member disposed below the first non-folding area; a second support member disposed below the second non-folding area; a first hinge slidably coupled to the first support member and disposed below the folding area; a second hinge slidably coupled to the second support member and disposed below the folding area; a first multi joint body coupled to the first support member; a second multi joint body spaced apart from the first multi joint body in the first direction and coupled to the second support member; and a central joint disposed between the first multi joint body and the second multi joint body, the central joint coupled to the first multi joint body and the second multi joint body, the central joint overlapping at least a portion of the first multi joint body and at least a portion of the second multi joint body in a plan view.

In an embodiment, the central joint may include: a base portion having a half-cylindrical shape, the base portion disposed in a space formed in the first hinge and in a space formed in the second hinge; and a joint portion disposed above the base portion and coupled to the first multi joint body and the second multi joint body.

In an embodiment, the base portion may support the first multi joint body and the second multi joint body in case that the display panel is folded.

In an embodiment, the first hinge may include: a first support portion disposed below the first multi joint body, wherein the space in which the base portion is disposed is defined in the first support portion; and a first coupling portion disposed in the space in which the base portion is disposed, the first coupling portion coupled to the base portion.

In an embodiment, the first support portion may support at least a portion of the first multi joint body in case that the display panel is unfolded.

In an embodiment, the electronic device may further include a hinge holder which includes: a holder portion coupled to the base portion; and a protrusion portion protruding from the holder portion in a second direction intersecting the first direction, the protrusion portion coupled to the first coupling portion. The first coupling portion may be coupled to the base portion by the hinge holder.

In an embodiment, the first coupling portion may be rotatably coupled to the protrusion portion.

In an embodiment, the holder portion may include an opening. The hinge holder may include a pin passing through the opening, the pin coupling the holder portion to the base portion.

In an embodiment, the base portion includes a hinge groove that accommodates the first coupling portion and the hinge holder.

In an embodiment, the first hinge may be rotatable about a first rotation axis extending in a second direction crossing the first direction. The second hinge may be rotatable about a second rotation axis extending in the second direction, the second hinge being spaced apart from the first rotation axis in the first direction.

In an embodiment, the display panel may be folded about a folding axis extending in the second direction. The first rotation axis and the second rotation axis may be spaced apart from each other in the first direction. The folding axis may be disposed between the first rotation axis and the second rotation axis in a plan view.

In an embodiment, the electronic device may further include a plate disposed between the display panel and the folding module.

In an embodiment, grooves may be defined in an area of the plate overlapping the folding area in a plan view.

In an embodiment, the first multi joint body, the second multi joint body, and the central joint may overlap the grooves in a plan view.

In an embodiment, an electronic device may include: a display panel which is foldable or unfoldable; and a folding module disposed below the display panel. The folding module may include: a first multi joint body disposed below the display panel; a second multi joint body spaced apart from the first multi joint body in a first direction; a first hinge that contacts at least a portion of the first multi joint body and is disposed below the first multi joint body in case that the display panel is unfolded; a second hinge that contacts at least a portion of the second multi joint body and is disposed below the second multi joint body in case that the display panel is unfolded; and a central joint that contacts the first multi joint body and the second multi joint body and is coupled to the first multi joint body and the second multi joint body in case that the display panel is folded.

In an embodiment, the folding module may include a hinge holder which includes: a holder portion coupled to the central joint; and a protrusion portion protruding from the holder portion in a second direction intersecting the first direction, the protrusion portion coupled to the first hinge.

In an embodiment, the first hinge may be rotatably coupled to the protrusion portion.

In an embodiment, the first hinge may be rotatable about a first rotation axis extending in a second direction intersecting the first direction. The second hinge may be rotatable about a second rotation axis extending in the second direction and the second hinge being spaced apart from the first rotation axis in the first direction.

In an embodiment, the display panel may be folded about a folding axis extending in the second direction. The first rotation axis and the second rotation axis may be spaced apart from each other in the first direction. The folding axis may be disposed between the first rotation axis and the second rotation axis in a plan view.

In an embodiment, the electronic device may further include a plate disposed between the display panel and the folding module. Grooves may be defined in an area of the plate overlapping the first multi joint body, the second multi joint body, and the central joint in a plan view.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
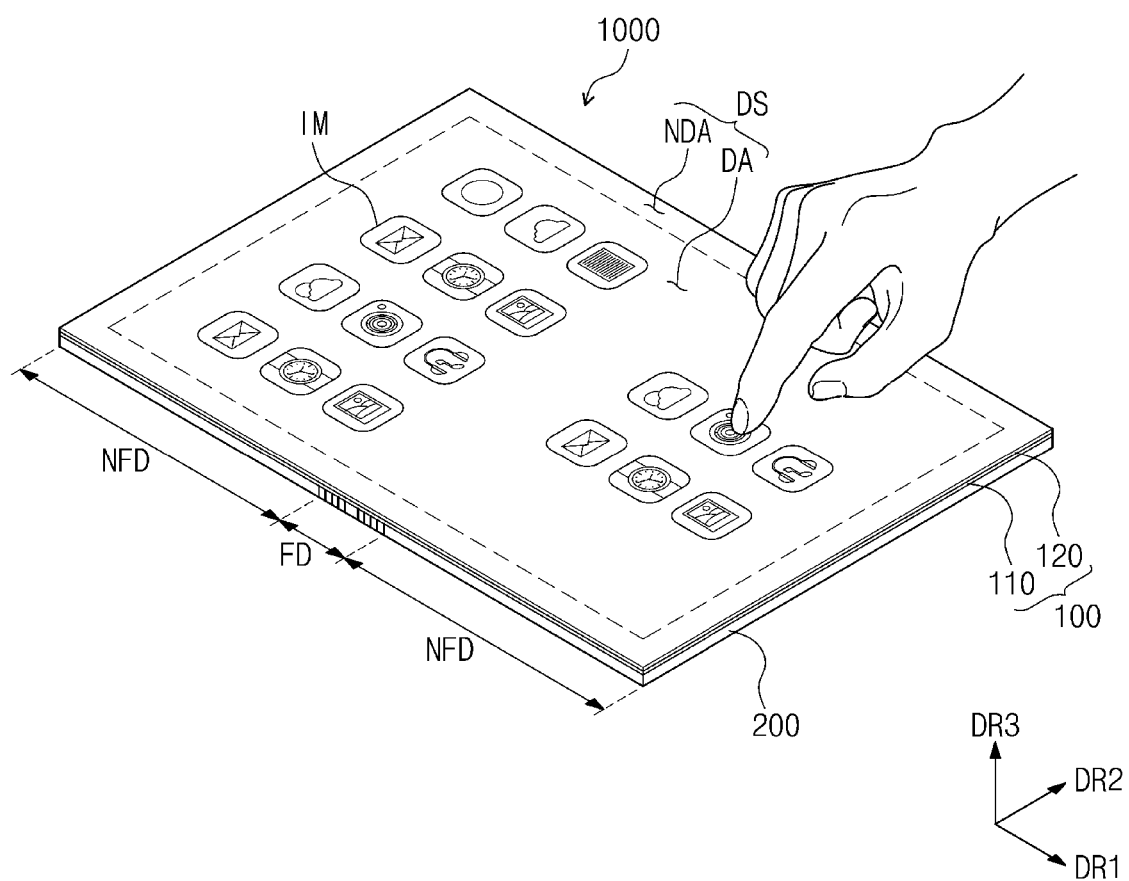
FIG. 1 is a schematic perspective view of an electronic device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the specification, it will be understood that when an element (or a region, a layer, a portion, or the like) is referred to as being "on", "connected to" or "coupled to" another element, it can be directly disposed on, connected, or coupled to another element mentioned above, or intervening elements may be disposed therebetween.

Like numbers refer to like elements throughout. Also, in the drawings, the thicknesses, ratios, and dimensions of the elements are exaggerated for effective description of the technical contents.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

Although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the scope of the embodiments. The singular forms include the plural forms as well unless the context clearly indicates otherwise.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The phrase "in a plan view" means viewing the object from the top, and the phrase "in a schematic cross-sectional view" means viewing a cross-section of which the object is vertically cut from the side.

Unless otherwise defined, all terms (including technical and scientific terms) used herein have the same meaning as commonly understood by one of ordinary skill in the art to which the disclosure belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It will be understood that the term "includes" or "comprises", when used in this specification, specifies the presence of stated features, integers, steps, operations, elements, components, or a combination thereof, but does not preclude the presence or addition of one or more other features, integers, steps, operations, elements, components, or combinations thereof.

Hereinafter, embodiments will be described with reference to the drawings.

Figure 2:
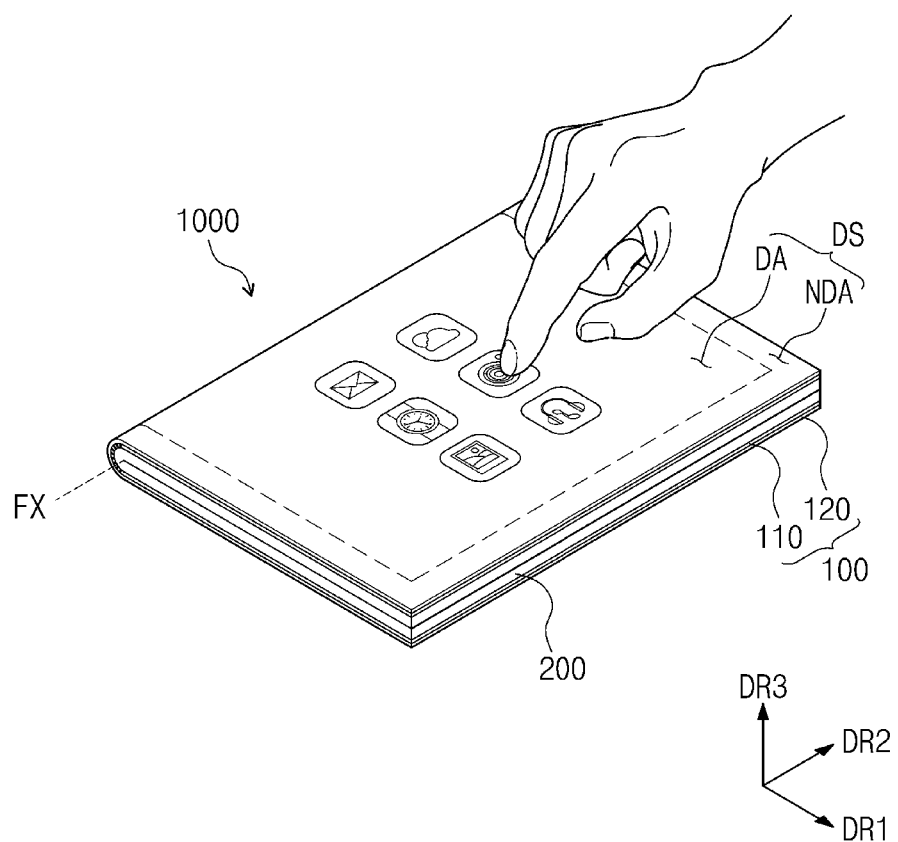
FIG. 2 schematically illustrates an electronic device according to an embodiment that is out-folded.

FIG. 1 is a schematic perspective view of an electronic device according to an embodiment, and FIG. 2 schematically illustrates an electronic device according to an embodiment that is out-folded.

Referring to FIGS. 1 and 2, an electronic device 1000 according to an embodiment may have a rectangular shape having long sides in a first direction DR1 and having short sides in a second direction DR2 crossing the first direction DR1. However, the embodiment is not limited thereto, and the electronic device 1000 may have various shapes. The electronic device 1000 may be a flexible electronic device 1000 or may be a folding-type (foldable) electronic device 1000 which is folded or unfolded about a folding axis FX. The folding axis FX may extend in the second direction DR2.

The electronic device 1000 may be divided into areas depending on whether an area is folded or not. For example, the electronic device 1000 may be divided into a folding area FD, in which the electronic device 1000 is folded, and two non-folding areas NFD, in case that the electronic device 1000 is in a flat state. The non-folding areas NFD may be arranged in the first direction DR1, and the folding area FD may be disposed between the two non-folding areas NFD. In the embodiment, one folding area FD is defined in the electronic device 1000. However, the embodiment is not limited thereto, and multiple folding areas may be defined in the electronic device 1000.

The electronic device 1000 may include a display panel 100 and a folding module 200 disposed below the display panel 100. The top surface of the display panel 100 may be defined as a display surface DS and may be a plane parallel to both the first direction DR1 and the second direction DR2. Through the display surface DS, images IM generated in the display panel 100 may be provided to a user.

The thickness direction of the display panel 100 may be parallel to a third direction DR3 that intersects both the first direction DR1 and the second direction DR2. Thus, a front surface (or a top surface) and a rear surface (or a bottom surface) of each of members constituting the display panel 100 may be defined by the third direction DR3. In the specification, the expression of "in a plan view" may be defined as a state when viewed in the third direction DR3.

The display surface DS may include a display area DA and a non-display area NDA around the display area DA. The display area DA may display an image, and the non-display area NDA may not display an image. The non-display area NDA may provide an edge portion of the electronic device 1000, which surrounds the display area DA and is printed with a color.

The display panel 100 may have flexibility. For example, the display panel 100 may operate while it is folded or unfolded. The display panel 100 may include a display layer 110 and a sensor layer 120 disposed on the display layer 110. The display layer 110 may generate an image and provide the image to a user. The display layer 110 may be a light emitting-type display layer, but is not particularly limited thereto. For example, the display layer 110 may be an organic light emitting display layer, an inorganic light emitting display layer, a nano-LED display layer, or a micro-LED display layer. A light emitting layer of the organic light emitting display layer may include an organic light emitting material. A light emitting layer of the inorganic light emitting display layer may include quantum dots, quantum rods, or the like. A light emitting layer of the nano-LED display layer may include nano-LEDs. A light emitting layer of the micro-LED display layer may include micro-LEDs.

The sensor layer 120 may sense an external input (a hand of a user, a touch pen, or the like), change the input into an input signal, and provide the input signal to the display layer 110. The sensor layer 120 may include touch sensor parts (not shown) for sensing the external input. The touch sensor parts may sense the external input in a capacitive method. The display layer 110 may receive the input signal from the sensor layer 120 and generate an image corresponding to the input signal.

The folding module 200 may support the display panel 100 and may be folded while rotating about the folding axis FX. As the folding module 200 is folded, the display panel 100 having flexibility may be folded by the folding module 200. The folding module 200 enables the electronic device 1000 to be out-folded so that the display surface DS of the display panel 100 is exposed to the outside when the electronic device 1000 is folded.

Figure 3:
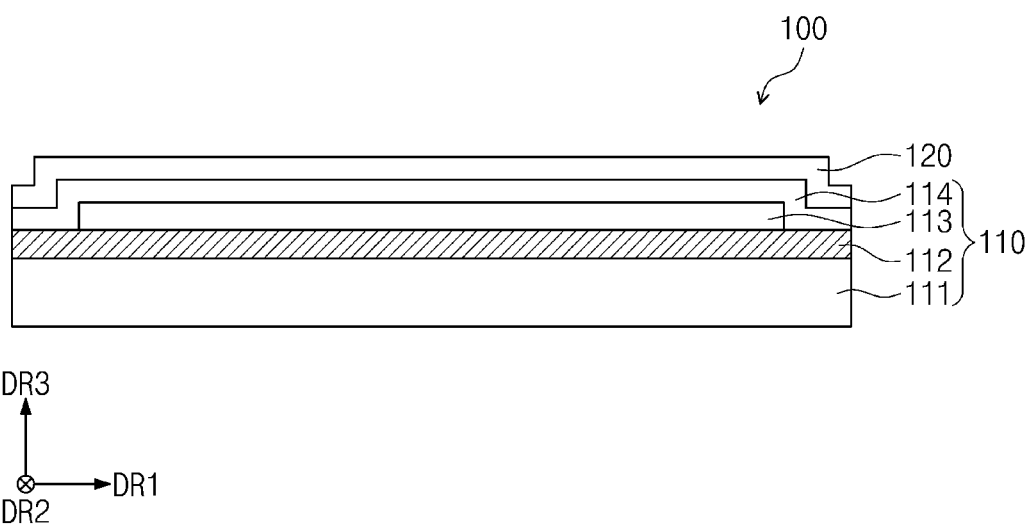
FIG. 3 is a schematic cross-sectional view of a display panel according to an embodiment.

FIG. 3 is a schematic cross-sectional view of a display panel 100 according to an embodiment.

A display layer 110 may include a base layer 111, a circuit layer 112, a light emitting element layer 113, and an encapsulation layer 114.

The base layer 111 may include a synthetic resin film. The synthetic resin film may include thermosetting resin. The base layer 111 may have a multi-layer structure. For example, the base layer 111 may have a three-layer structure of a synthetic resin layer, an adhesive layer, and a synthetic resin layer. The synthetic resin layer may be a polyimide-based resin layer, but the material thereof is not particularly limited thereto. The synthetic resin layer may include at least one of an acryl-based resin, a methacryl-based resin, polyisoprene, a vinyl-based resin, an epoxy-based resin, a urethane-based resin, a cellulose-based resin, a siloxane-based resin, a polyamide-based resin, and a perylene-based resin. The base layer 111 may include a glass substrate or an organic/inorganic composite material substrate, or the like.

The circuit layer 112 may be disposed on the base layer 111. The circuit layer 112 may include an insulating layer, a semiconductor pattern, a conductive pattern, a signal line, and the like. The insulating layer, the semiconductor layer, and the conductive layer are formed on the base layer 111 through coating and deposition methods, and subsequently, the insulating layer, the semiconductor layer, and the conductive layer may be selectively patterned through photolithography processes performed multiple times. Thus, the semiconductor pattern, the conductive pattern, and the signal lines included in the circuit layer 112 may be formed.

The light emitting element layer 113 may be disposed on the circuit layer 112. The light emitting element layer 113 may include a light emitting element. For example, the light emitting element layer 113 may include an organic light emitting material, quantum dots, quantum rods, or micro-LEDs.

The encapsulation layer 114 may be disposed on the light emitting element layer 113. The encapsulation layer 114 may include an inorganic layer, an organic layer, and an inorganic layer which are stacked in this order, but layers constituting the encapsulation layer 114 are not limited thereto.

The inorganic layers may protect the light emitting element layer 113 from moisture and oxygen, and the organic layer may protect the light emitting element layer 113 from foreign substances such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, but the embodiment is not limited thereto.

A sensor layer 120 may be disposed on the display layer 110. The sensor layer 120 may sense an external input applied from the outside. The external input may be an input of a user. The input of the user may include various types of external inputs such as a portion of the user's body, light, heat, a pen, or pressure.

The sensor layer 120 may be formed on the display layer 110 through a continuous process. The sensor layer 120 may be disposed directly on the display layer 110. Being disposed directly on may represent that an intervening third component is not disposed between the sensor layer 120 and the display layer 110. A separate adhesive member may not be disposed between the sensor layer 120 and the display layer 110.

In another embodiment, the sensor layer 120 may be disposed on the display layer 110 through an adhesive member. The adhesive member may include a general adhesive or bonding agent.

Figure 4:
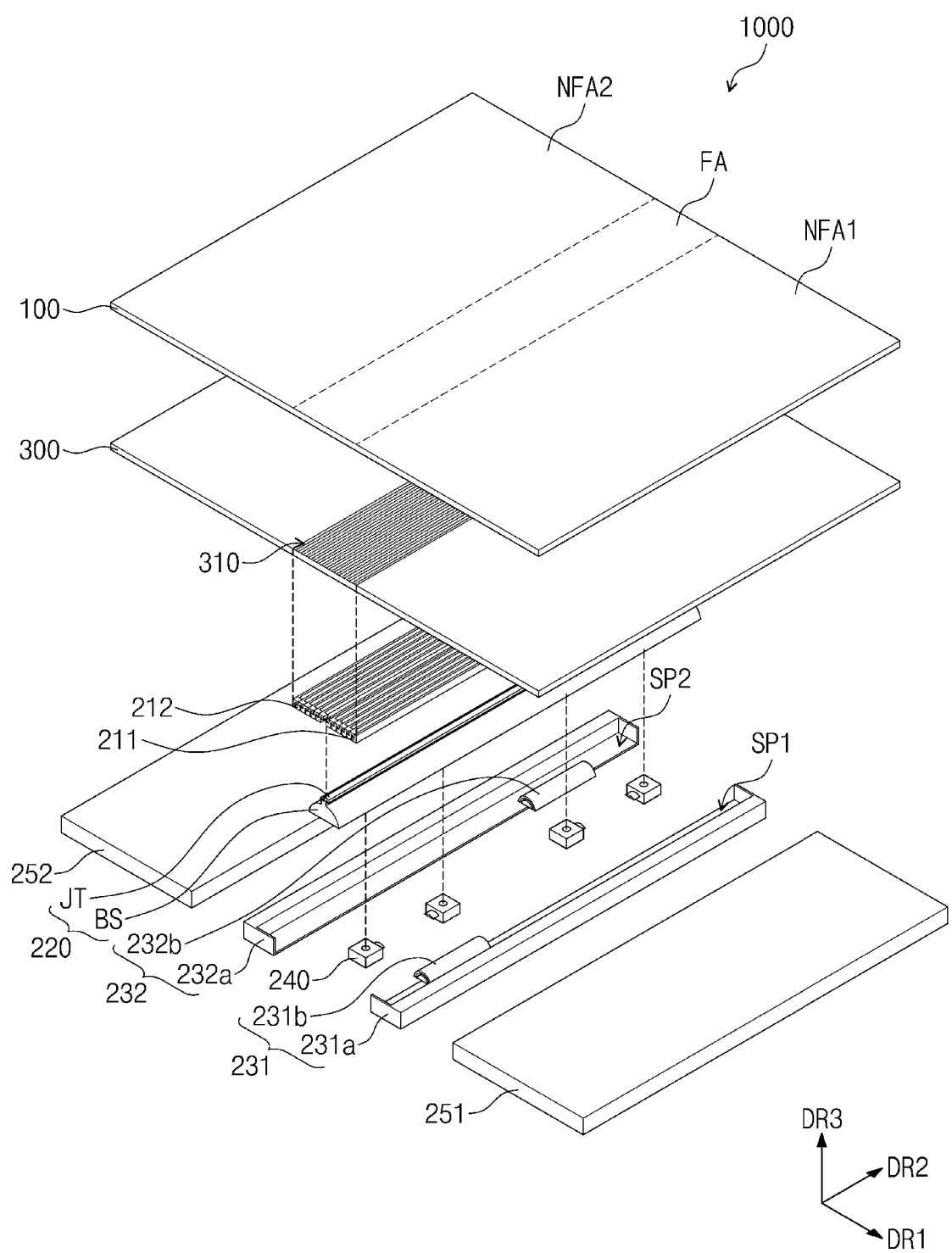
FIG. 4 is an exploded schematic perspective view of an electronic device according to an embodiment.

FIG. 4 is an exploded schematic perspective view of an electronic device according to an embodiment.

Referring to FIG. 4, the electronic device 1000 may include a display panel 100, a folding module 200 (refer to FIG. 1), and a plate 300.

The display panel 100 may include a first non-folding area NFA1, a second non-folding area NFA2, and a folding area FA. The second non-folding area NFA2 may be spaced apart from the first non-folding area NFA1 in a first direction DR1. The folding area FA may be disposed between the first non-folding area NFA1 and the second non-folding area NFA2. The folding area FA may be an area which is folded about a folding axis FX (refer to FIG. 2).

In a plan view, the first non-folding area NFA1 and the second non-folding area NFA2 of the display panel 100 may overlap the non-folding areas NFD (refer to FIG. 1) of the electronic device 1000. The folding area FA of the display panel 100 may overlap the folding area FD (refer to FIG. 1) of the electronic device 1000.

The folding module 200 (refer to FIG. 1) may be disposed below the display panel 100.

The plate 300 may be disposed between the display panel 100 and the folding module 200. The plate 300 may be disposed below the first non-folding area NFA1, the second non-folding area NFA2, and the folding area FA. The plate 300 may have a continuous shape.

The plate 300 may include a material having a modulus of elasticity of about 60 GPa or greater at room temperature. The plate 300 may include a metal material. The metal plate 300 may include stainless steel, but the embodiment is not limited thereto. For example, the plate 300 may include a titanium alloy (Ti alloy) or Invar. Also, the plate 300 may include a glass substrate or a plastic substrate. For example, the plate 300 may include polyethylene. The plate 300 may support components disposed above the plate 300.

The plate 300 may include a material having thermal conductivity. The heat dissipation performance of the electronic device 1000 may be improved by the plate 300.

Grooves 310 may be included in a portion of the plate 300. The grooves 310 may be defined in an area overlapping the folding area FA. The grooves 310 may overlap the folding area FA in a plan view. The shape plate 300 may be more easily changed in the portion including the grooves 310.

The plate 300 may be folded or unfolded along with the display panel 100. The plate 300 may support the display panel 100 which is folded or unfolded, and thus the flatness of the display panel 100 may be improved. The folding area FA of the display panel 100 may be supported by the plate 300, and thus maintaining the flatness and reducing deformation of the folding area FA when the display panel is unfolded.

The folding module 200 may include a first multi joint body 211, a second multi joint body 212, a central joint 220, a first hinge 231, a second hinge 232, a hinge holder 240, a first support member 251, and a second support member 252.

The first multi joint body 211 may include at least one joint and may also be referred to as the first joints 211. The second multi joint body 212 may include at least one joint and may also be referred to as the second joints 212.

In a plan view, the first joints 211 may overlap the folding area FA. The first joints 211 may overlap the grooves 310. The first joints 211 may be adjacent to the first non-folding area NFA1 in a plan view.

The second joints 212 may be spaced apart from the first joints 211 in the first direction DR1. The second joints 212 may overlap the folding area FA. The second joints 212 may overlap the grooves 310. The second joints 212 may be adjacent to the second non-folding area NFA2 in a plan view.

The central joint 220 may be disposed between the first joints 211 and the second joints 212 and coupled to the first joints 211 and coupled to the second joints 212. The central joint 220 may overlap at least one of the first joints 211 and at least one of the joints 212 in a plan view. The central joint 220 may overlap the grooves 310 in a plan view.

The central joint 220 may include a base portion BS and a joint portion JT. The base portion BS may have a half-cylindrical shape extending in a second direction DR2. The joint portion JT may be disposed on the base portion BS. The joint portion JT may be disposed between the first joints 211 and the second joints 212. The joint portion JT may be coupled to the first joints 211 and the second joints.

The first hinge 231 may be disposed below the folding area FA. The first hinge 231 may be disposed below the first joints 211.

The first hinge 231 may include a first support portion 231a and a first coupling portion 231b. The first support portion 231a may be disposed below the first joints 211. A space SP1 for accommodating a portion of the base portion BS may be formed in the first support portion 231a. The first coupling portion 231b may be disposed in the space SP1.

The first coupling portion 231b may have a half-cylindrical shape extending in the second direction DR2.

The second hinge 232 may be disposed below the folding area FA. The second hinge 232 may be disposed below the second joints 212.

The second hinge 232 may include a second support portion 232a and a second coupling portion 232b. The second support portion 232a may be disposed below the second joints 212. A space SP2 for accommodating a portion of the base portion BS may be defined in the second support portion 232a. The second coupling portion 232b may be disposed in the space SP2. The second coupling portion 232b may have a half-cylindrical shape extending in the second direction DR2.

The central joint 220 may be coupled to the first hinge 231 and the second hinge 232 by hinge holders 240.

The first support member 251 may be disposed below the first non-folding area NFA1. The first support member 251 may be slidably coupled to the first hinge 231. The first support member 251 may be coupled to the first joints 211.

The second support member 252 may be disposed below the second non-folding area NFA2. The second support member 252 may be slidably coupled to the second hinge 232. The second support member 252 may be coupled to the second joints 212.

An inner space may be defined in each of the first support member 251 and the second support member 252. Electronic components may be accommodated in the inner spaces. For example, the electronic components may include a battery, a main circuit board, and the like.

Figure 5:
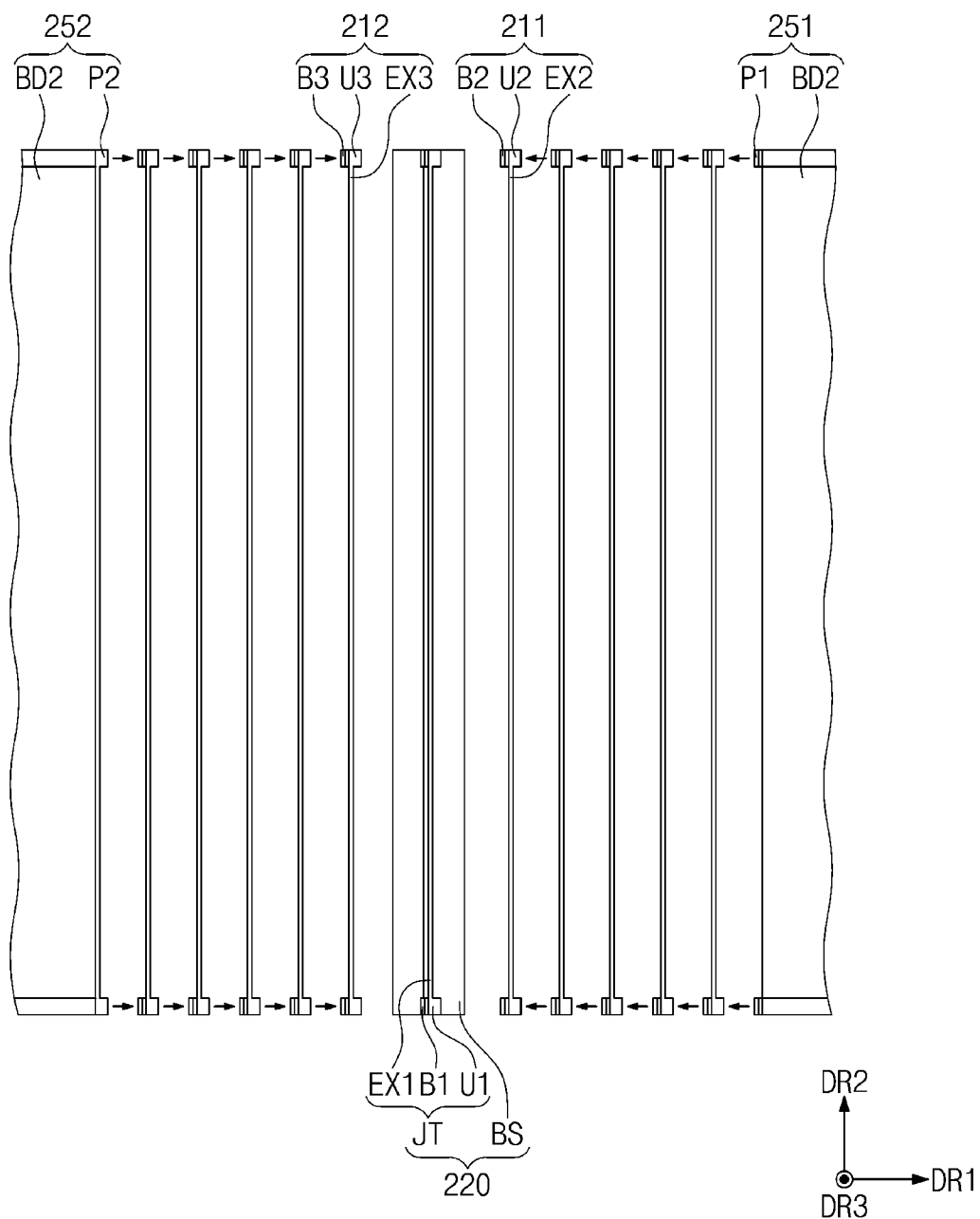
FIG. 5 is an exploded schematic plan view illustrating a portion of a folding module according to an embodiment.

FIG. 5 is an exploded plan view illustrating a portion of a folding module 200 according to an embodiment.

Referring to FIG. 5, first joints 211, a first support member 251, and a central joint 220 may be rotatably coupled to each other. Second joints 212, a second support member 252, and the central joint 220 may be rotatably coupled to each other.

The central joint 220 may include a base portion BS and a joint portion JT disposed on the base portion BS. The joint portion JT may include an extension EX1 extending in a second direction DR2 and protrusions B1 and U1 protruding from both sides of the extension EX1 in a first direction DR1. The protrusions B1 and U1 may protrude in opposite directions when viewed in the second direction DR2. The protrusions B1 and U1 may include a first protrusion B1 and a second protrusion U1. The first protrusion B1 may be disposed at a lower position than the second protrusion U1 when viewed in the second direction DR2.

Each of the first joints 211 may include an extension EX2 extending in the second direction DR2 and protrusions B2 and U2 protruding from both sides of the extension EX2 in the first direction DR1. The protrusions B2 and U2 may protrude in opposite directions when viewed in the second direction DR2. The protrusions B2 and U2 may include a first protrusion B2 and a second protrusion U2. The first protrusion B2 may be disposed at a lower position than the second protrusion U2 when viewed in the second direction DR2.

The first protrusion B2 of each of the first joints 211 may have the same shape as the first protrusion B1 of the central joint 220. The second protrusion U2 of each of the first joints 211 may have the same shape as the second protrusion U1 of the central joint 220.

In the first joints 211, a first protrusion B2 of a first joint and a second protrusion U2 of a neighboring first joint may overlap with and be rotatably coupled to each other.

The first protrusion B2 of the first joint adjacent to the central joint 220 may overlap with and be rotatably coupled to the second protrusion U1 of the central joint 220.

The first support member 251 may include a body BD1 and a protrusion P1. The protrusion P1 protrudes from the body BD1 in the first direction DR1. The protrusion P1 of the first support member 251 may have the same shape as the first protrusion B2 of each of the first joints 211.

The protrusion P1 of the first support member 251 may overlap with and be rotatably coupled to the second protrusion U2 of the first joint adjacent to the first support member 251.

Each of the second joints 212 may include an extension EX3 extending in the second direction DR2 and protrusions B3 and U3 protruding from both sides of the extension EX3 in the first direction DR1. The protrusions B3 and U3 may protrude in opposite directions when viewed in the second direction DR2. The protrusions B3 and U3 may include a first protrusion B3 and a second protrusion U3. The first protrusion B3 may be disposed at a lower position than the second protrusion U3 when viewed in the second direction DR2.

The first protrusion B3 of each of the second joints 212 may have the same shape as the first protrusion B1 of the central joint 220. The second protrusion U3 of each of the second joints 212 may have the same shape as the second protrusion U1 of the central joint 220.

In the second joints 212, a first protrusion B3 of a second joint and a second protrusion U3 of a neighboring second joint may overlap with and be rotatably coupled to each other.

The second protrusion U3 of the second joint adjacent to the central joint 220 may overlap with and be rotatably coupled to the first protrusion B1 of the central joint 220.

The second support member 252 may include a body BD2 and a protrusion P2. The protrusion P2 protrudes from the body BD2 in the first direction DR1. The protrusion P2 of the second support member 252 may have the same shape as the second protrusion U3 of each of the second joints 212.

The protrusion P2 of the second support member 252 may overlap with and be rotatably coupled to the first protrusion B3 of the second joint adjacent to the second support member 252.

However, this is merely an example, and methods for coupling the first support member 251, the first joints 211, the central joint 220, the second joints 212, and the second support member 252 according to an embodiment are not limited thereto. For example, the first support member 251, the first joints 211, the central joint 220, the second joints 212, and the second support member 252 may be rotatably coupled to each other through pins.

Figure 6:
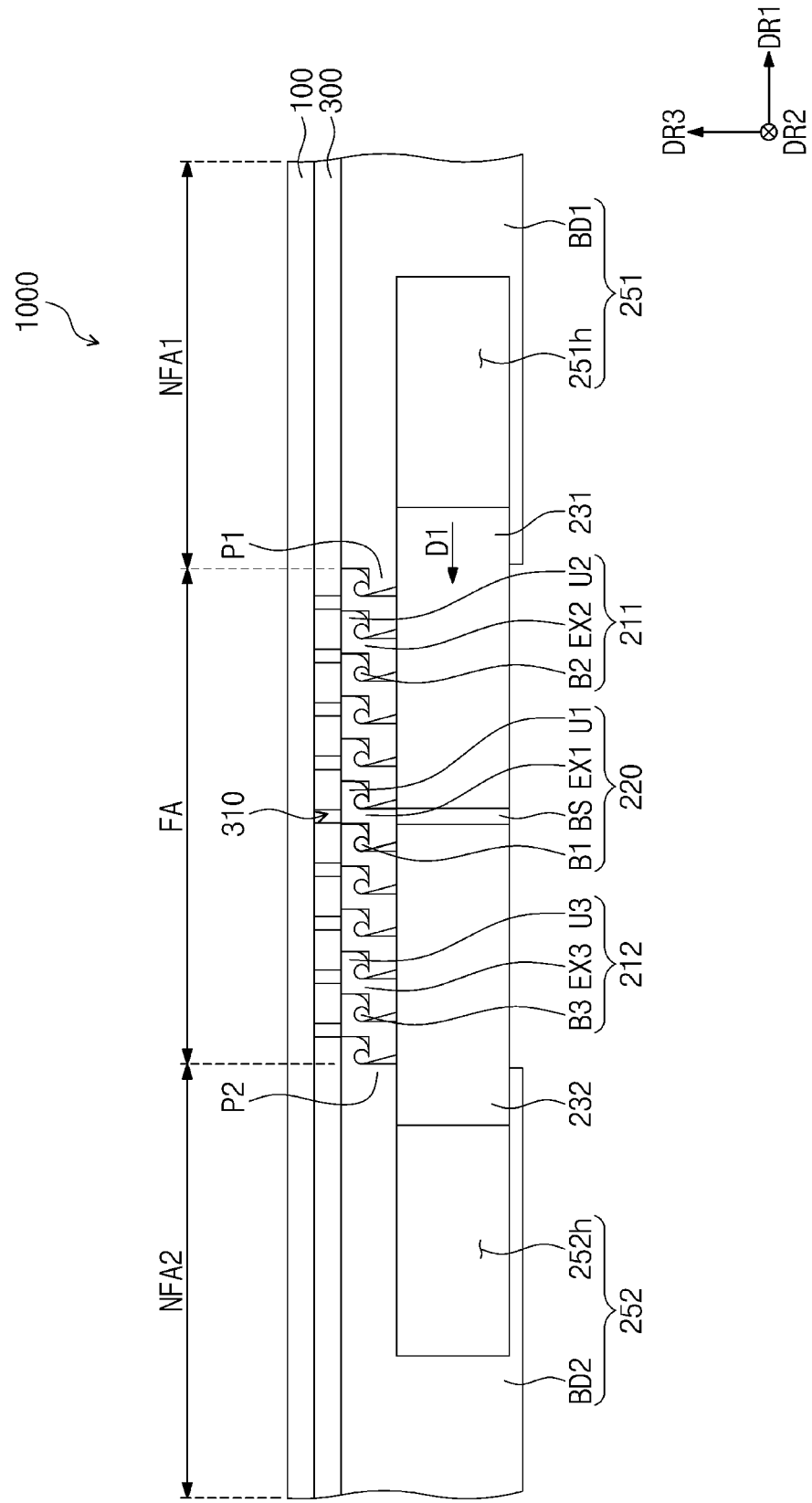
FIG. 6 is a schematic cross-sectional view illustrating an unfolded electronic device according to an embodiment.

FIG. 6 is a cross-sectional view illustrating an unfolded electronic device according to an embodiment.

Referring to FIG. 6, a first sliding hole 251h may be included in a body BD1 of a first support member 251. The first sliding hole 251h may extend in a first direction DR1. A first hinge 231 may be disposed in the first sliding hole 251h and may slide therein.

A second sliding hole 252h may be included in a body BD2 of a second support member 252. The second sliding hole 252h may extend in the first direction DR1. A second hinge 232 may be disposed in the second sliding hole 252h and may slide therein.

During an unfolding operation, the first hinge 231 may move in a first sliding direction D1, and the second hinge 232 may move in a direction opposite to the first sliding direction D1. The first sliding direction D1 may be parallel to the first direction DR1. The first sliding direction D1 may be a direction toward a central region of the electronic device 1000. The first hinge 231 and the second hinge 232 may overlap a base portion BS in the unfolded state when viewed in the second direction DR2.

When the electronic device 1000 is unfolded, the base portion BS may be disposed and accommodated in a first space SP1 (refer to FIG. 4) of the first hinge 231 and a second space SP2 (refer to FIG. 4) of the second hinge 232. The base portion BS may not be exposed to the outside when the electronic device 1000 is unfolded.

A plate 300 may be disposed below a display panel 100 to support the display panel 100. A folding module 200 may be disposed below the plate 300 to support the plate 300 and the display panel 100.

When the display panel 100 is unfolded, a first support portion 231a of the first hinge 231 may contact at least a portion of a first joints 211. The first support portion 231a may support at least the portion of the first joints 211.

When the display panel 100 is unfolded, a second support portion 232a of the second hinge 232 may contact at least a portion of a second joints 212. The second support portion 232a may support at least the portion of the second joints 212.

According to an embodiment, the flatness of the display panel 100 may be improved by the first hinge 231 and the second hinge 232 of the folding module 200 when the display panel 100 is unfolded. The shape of a folding area FA may be maintained by the plate 300 and the folding module 200 in the unfolded state. The folding module 200 may prevent the folding area FA of the display panel 100 from being deflected downward. The downward deflection may occur when stress is applied to the folding area FA of the display panel 100 due to the repeated folding or unfolding of the display panel 100, thus causing the folding area FA to be deflected downward. The deformation of the folding area FA when the display panel 100 is unfolded may be reduced by the plate 300 and the folding module 200. Thus, the flatness of the unfolded display panel 100 may be improved.

Figure 7:
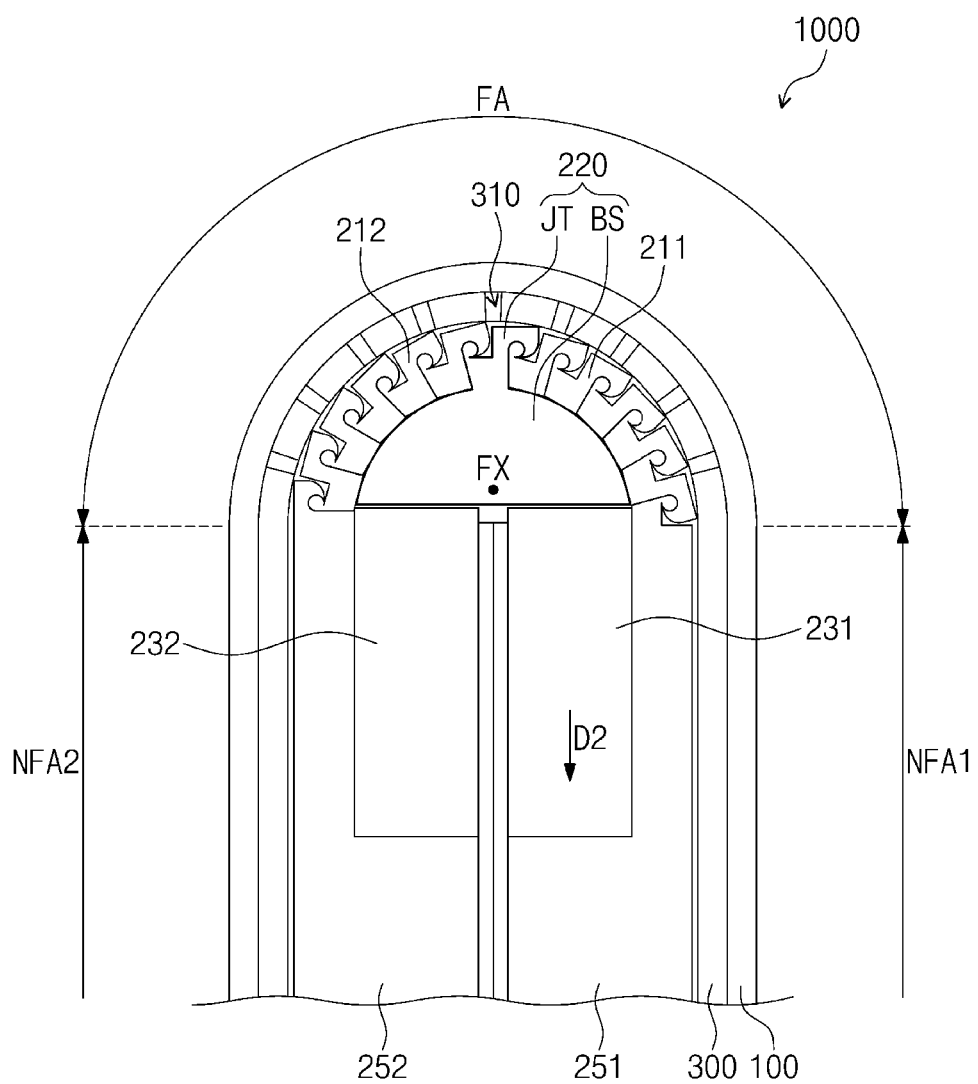
FIG. 7 is a schematic cross-sectional view illustrating a folded electronic device according to an embodiment.

FIG. 7 is a cross-sectional view illustrating a folded state of an electronic device according to an embodiment.

Referring to FIG. 7, a display panel 100 may be folded about a folding axis FX. A folding module 200 enables an electronic device 1000 to be out-folded so that a display surface DS of the display panel 100 is exposed to the outside when the electronic device 1000 is folded.

During a folding operation, a first hinge 231 may move in a second sliding direction D2. A second hinge 232 may move in the second sliding direction D2. The second sliding direction D2 may be parallel to a third direction DR3. The second sliding direction D2 may be a direction away from a central region of the electronic device 1000. The first hinge 231 and the second hinge 232 may not overlap a base portion BS in the folded state when viewed in the second direction DR2.

In the folded state, a first support member 251 and a second support member 252 may face each other. The first hinge 231 and the second hinge 232 may face each other.

When the display panel 100 is folded, the base portion BS of a central joint 220 may contact the first joints 211. The base portion BS may support the first joints 211.

When the display panel 100 is in the folded state, the base portion BS may contact the second joints 212. The base portion BS may support the second joints 212.

According to an embodiment, stress generated in a folding area FA of the display panel 100 may be reduced by the central joint 220 of the folding module 200 when the display panel 100 folded. The shape of the folding area FA may be maintained by a plate 300 and the folding module 200 in the folded state. The deformation the folding area FA in the folded state may be reduced by the plate 300 and the folding module 200. Thus, the stress applied to the folding area FA of the display panel 100 in the folded state may be reduced.

Figure 8:
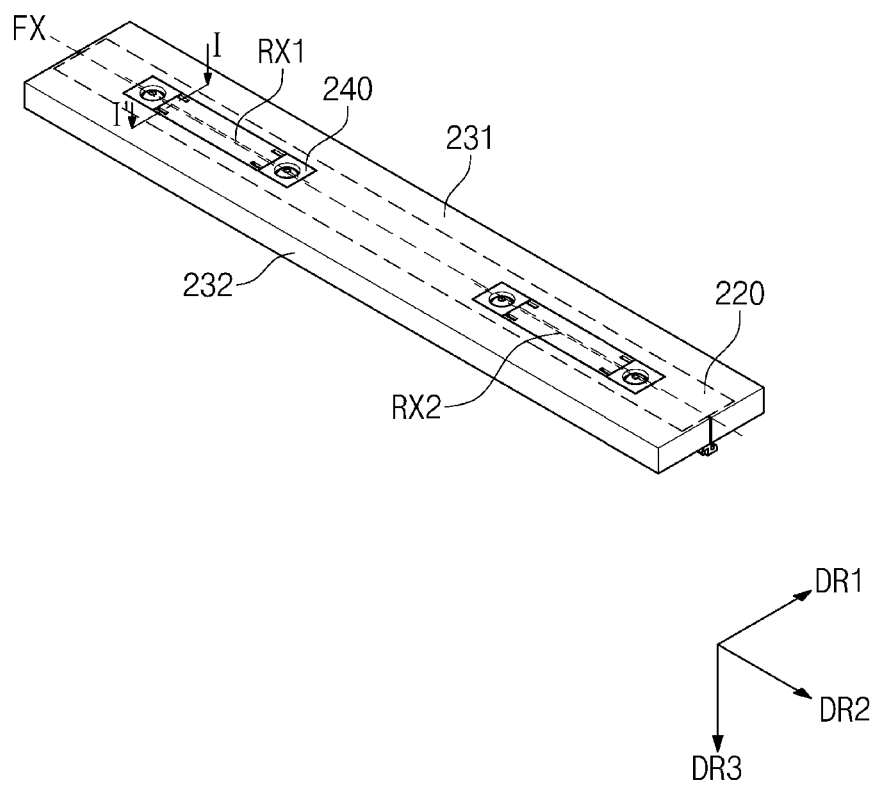
FIG. 8 is a see-through schematic perspective view illustrating a portion of a folding module according to an embodiment.
Figure 9:
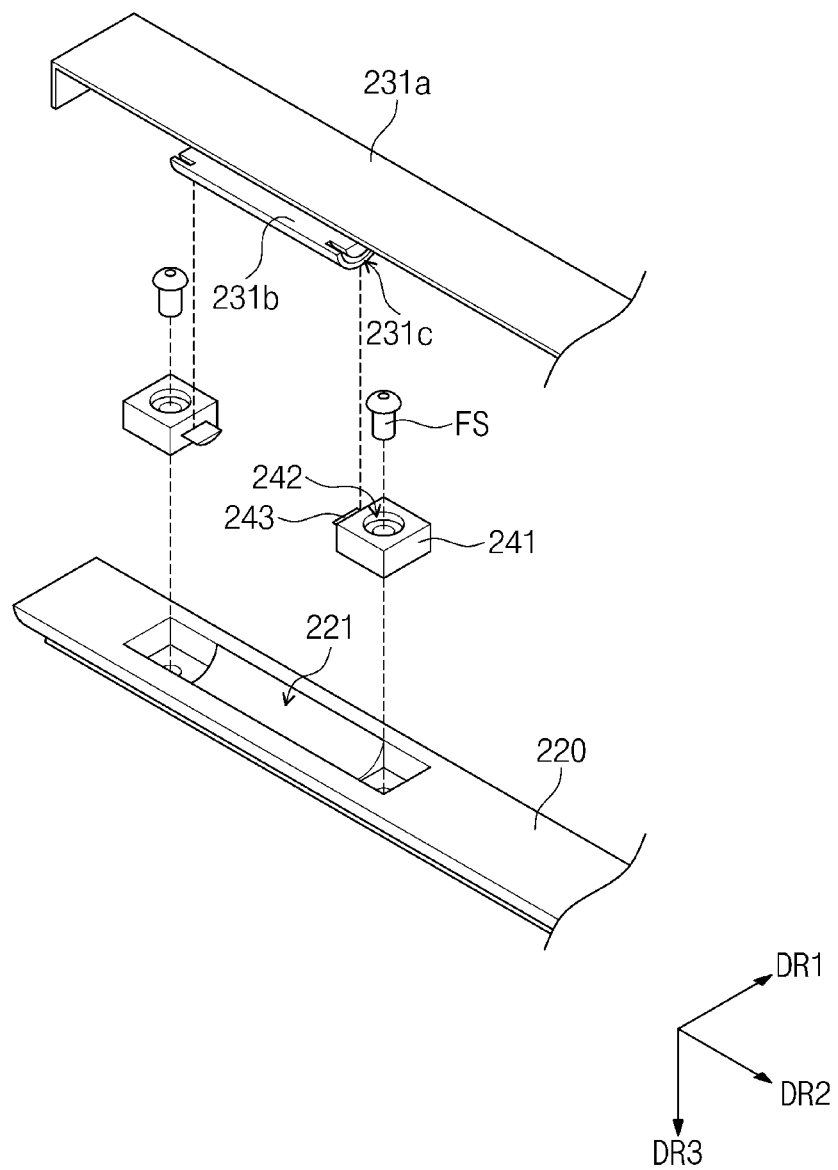
FIG. 9 is an exploded schematic perspective view illustrating a portion of a folding module according to an embodiment.

FIG. 8 is a see-through schematic perspective view illustrating a portion of a folding module 200 according to an embodiment, and FIG. 9 is an exploded schematic perspective view illustrating a portion of a folding module 200 according to an embodiment.

Referring to FIGS. 8 and 9, a central joint 220 may include a base portion BS (refer to FIG. 4). A hinge groove 221 may be included in the base portion BS (refer to FIG. 4). The hinge groove 221 may be defined in an area which is adjacent towards the first support member 251 (refer to FIG. 4) from the center line of the base portion BS (refer to FIG. 4) extending in a second direction DR2. The hinge groove 221 may be referred to as a first hinge groove. The hinge groove 221 may accommodate a first coupling portion 231b and a hinge holder 240.

The central joint 220 may be coupled to a first hinge 231 and a second hinge 232 through hinge holders 240.

The hinge holder 240 may include a holder portion 241, a pin FS, and a protrusion portion 243.

The holder portion 241 may be coupled to the base portion BS. An opening 242 may be defined in the holder portion 241. The pin FS may pass through the opening 242 and couple the hinge holder 240 to the central joint 220. For example, the pin FS may include a screw. The protrusion portion 243 may protrude from the holder portion 241 in a second direction DR2. The protrusion portion 243 may be coupled to the first hinge 231.

The first hinge 231 may include a first support portion 231a and the first coupling portion 231b. A coupling groove 231c may be defined in the first coupling portion 231b. The protrusion portion 243 may be accommodated in the coupling groove 231c to couple the hinge holder 240 to the first hinge 231. The first coupling portion 231b may be accommodated in the hinge groove 221.

FIG. 9 schematically illustrates the coupling between the central joint 220 and the first hinge 231, but the coupling through the hinge holder 240 may also be applied to the central joint 220 and the second hinge 232.

The first hinge 231 may rotate about a first rotation axis RX1 extending in the second direction DR2. The first hinge groove (hinge groove 221) of the base portion BS (refer to FIG. 4) in which the first hinge 231 is accommodated may be defined in the area which is adjacent towards the first support member 251 (refer to FIG. 4) from the center line of the base portion BS (refer to FIG. 4).

The second hinge 232 may rotate about a second rotation axis RX2 extending in the second direction DR2. The second rotation axis RX2 may be spaced apart from the first rotation axis RX1 in a first direction DR1. The second hinge groove of the base portion BS (refer to FIG. 4) in which the second hinge 232 is accommodated may be defined in an area which is adjacent towards the second support member 252 (refer to FIG. 4) from the center line of the base portion BS extending in the second direction DR2. The second hinge groove may be spaced apart from the first hinge groove (hinge groove 221) in the first direction DR1.

In a plan view, the first rotation axis RX1 and the second rotation axis RX2 may be spaced apart from each other in the first direction DR1 with a folding axis FX disposed between the first rotation axis RX1 and the second rotation axis RX2.

Figure 10:
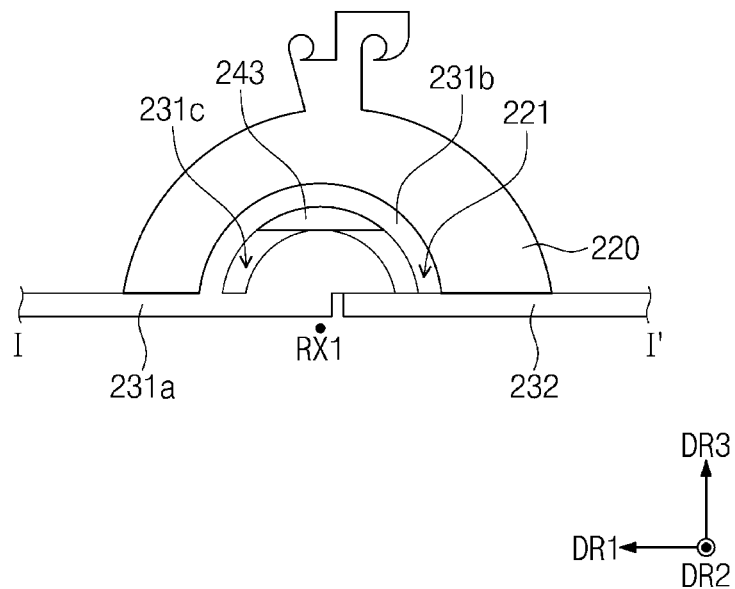
FIG. 10 is a schematic cross-sectional view of an unfolded folding module taken along line I-F of FIG. 8 according to an embodiment.
Figure 11:
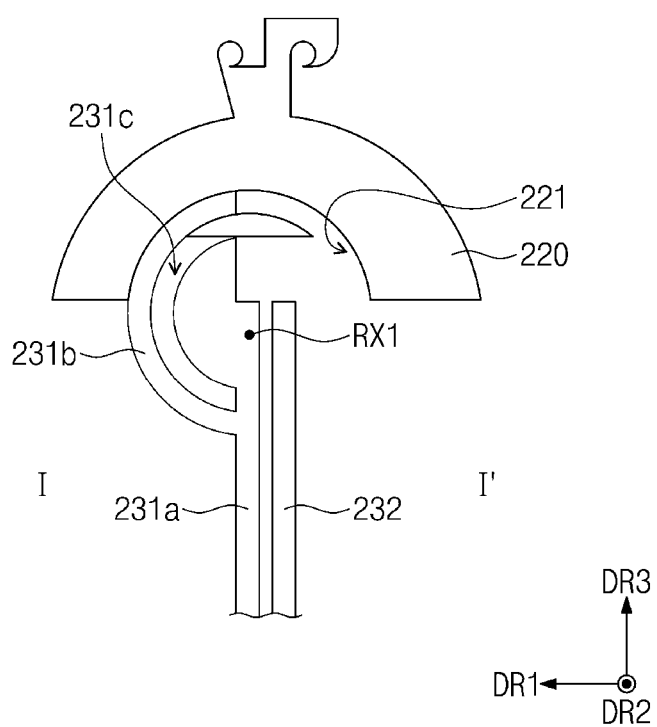
FIG. 11 is a schematic cross-sectional view of a folded folding module taken along line I-F of FIG. 8 according to an embodiment.

FIG. 10 is a cross-sectional view of an unfolded state taken along line I-I' of FIG. 8 according to an embodiment, and FIG. 11 is a cross-sectional view of a folded state taken along line I-I' of FIG. 8 according to an embodiment.

Referring to FIGS. 10 and 11, the protrusion portion 243 of the hinge holder 240 may be disposed in the coupling groove 231c of the first coupling portion 231b. The first coupling portion 231b may be rotatably coupled to the protrusion portion 243. The first hinge 231 (refer to FIG. 4) may rotate about the first rotation axis RX1.

FIGS. 10 and 11 illustrate the folding or unfolding operation about the first rotation axis RX1 of the central joint 220 and the protrusion portions 243 of the hinge holders 240 coupling the first hinge 231. A similar operation may also be applied to the folding or unfolding operation about the second rotation axis RX2 of the central joint 220 and the protrusion portions 243 of the hinge holders 240 coupling the second hinge 232.

As described above, when the display panel 100 is unfolded, the flatness of the display panel 100 may be improved by the first hinge 231 and the second hinge 232 of the folding module 200. In the unfolded state, the shape of the folding area FA may be supported by the first hinge 231 and the second hinge 232. The folding module 200 may prevent the folding area FA of the display panel 100 from being deflected downward. Deformation of the shape of the folding area FA of the unfolded display panel 100 may be reduced by the folding module 200. Thus, the flatness of the unfolded display panel 100 may be improved.

According to the embodiment, the stress generated in the folding area FA of the display panel 100 may be reduced by the central joint of the folding module when the display panel 100 is folded. The shape of the folding area FA in the folding state may be supported by the central joint. Deformation in the shape of the folding area of the folded display panel 100 may be reduced by the folding module 200. Thus, the stress applied to the folding area of the folded display panel 100 may be reduced.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. An electronic device comprising:
a display panel including:
a first non-folding area;
a second non-folding area spaced apart from the first non-folding area in a first direction; and
a folding area disposed between the first non-folding area and the second non-folding area; and
a folding module disposed below the display panel, wherein the folding module comprises:
a first support member disposed below the first non-folding area;
a second support member disposed below the second non-folding area;
a first hinge slidably coupled to the first support member via a first sliding hole in a distal end of the first support member and disposed below the folding area;
a second hinge slidably coupled to the second support member via a second sliding hole in a distal end of the second support member and disposed below the folding area;
a first multi joint body coupled to the first support member;
a second multi joint body spaced apart from the first multi joint body in the first direction and coupled to the second support member; and
a central joint disposed between the first multi joint body and the second multi-joint body, the central joint coupled to the first multi-joint body and the second multi-joint body, the central joint overlapping at least a portion of the first multi-joint body and at least a portion of the second multi joint body in a plan view, wherein
the first multi joint body includes a first extension extending in a second direction different from the first direction and includes a first protrusion protruding from one side of the first extension in the first direction and a second protrusion protruding from another side of the first extension in the first direction,
the second multi joint body includes a second extension extending in the second direction and includes a third protrusion protruding from one side of the second extension in the first direction and a fourth protrusion protruding from another side of the second extension in the first direction, and
the first protrusion and the third protrusion are disposed at a lower position than the second protrusion and the fourth protrusion when viewed in the second direction.

2. The electronic device of claim 1, wherein the central joint comprises:
a base portion having a half-cylindrical shape, the base portion disposed in a space formed in the first hinge and in a space formed in the second hinge; and
a joint portion disposed above the base portion and coupled to the first multi joint body and the second multi joint body.

3. The electronic device of claim 2, wherein the base portion supports the first multi joint body and the second multi joint body in case that the display panel is folded.

4. The electronic device of claim 2, wherein the first hinge comprises:
a first support portion disposed below the first multi-joint body, wherein the space in which the base portion is disposed is defined in the first support portion; and
a first coupling portion disposed in the space in which the base portion is disposed, the first coupling portion coupled to the base portion.

5. The electronic device of claim 4, wherein the first support portion supports at least a portion of the first multi-joint body in case that the display panel is unfolded.

6. The electronic device of claim 4, further comprising:
a hinge holder including:
a holder portion coupled to the base portion; and
a protrusion portion protruding from the holder portion in the second direction intersecting the first direction, the protrusion portion coupled to the first coupling portion, wherein the first coupling portion is coupled to the base portion by the hinge holder.

7. The electronic device of claim 6, wherein the first coupling portion is rotatably coupled to the protrusion portion.

8. The electronic device of claim 6, wherein
the holder portion includes an opening, and
the hinge holder includes a pin passing through the opening, the pin coupling the holder portion to the base portion.

9. The electronic device of claim 6, wherein the base portion includes a hinge groove that accommodates the first coupling portion and the hinge holder.

10. The electronic device of claim 1, wherein
the first hinge is rotatable about a first rotation axis extending in the second direction intersecting the first direction, and
the second hinge is rotatable about a second rotation axis extending in the second direction, the second hinge being spaced apart from the first rotation axis in the first direction.

11. The electronic device of claim 10, wherein
the display panel is folded about a folding axis extending in the second direction,
the first rotation axis and the second rotation axis are spaced apart from each other in the first direction, and
the folding axis is disposed between the first rotation axis and the second rotation axis in a plan view.

12. The electronic device of claim 1, further comprising:
a plate disposed between the display panel and the folding module.

13. The electronic device of claim 12, wherein grooves are defined in an area of the plate overlapping the folding area in a plan view.

14. The electronic device of claim 13, wherein the first multi joint body, the second multi-joint body, and the central joint overlap the grooves in a plan view.

15. An electronic device comprising:
a display panel which is configured to be folded and unfolded; and
a folding module disposed below the display panel,
wherein the folding module comprises:
a first multi joint body disposed below the display panel;
a second multi joint body spaced apart from the first multi joint body in a first direction;
a first hinge that contacts at least a portion of the first multi-joint body and is disposed below the first multi joint body in case that the display panel is unfolded;
a second hinge that contacts at least a portion of the second multi joint body and is disposed below the second multi joint body in case that the display panel is unfolded; and
a central joint that contacts the first multi-joint body and the second multi-joint body and is coupled to the first multi joint body and the second multi joint body in case that the display panel is folded, the central joint including a joint portion and a base portion BS having a half-cylindrical shape, the base portion disposed in a space formed in the first hinge and in a space formed in the second hinge when the display panel is unfolded, wherein
the first multi joint body includes a first extension extending in a second direction different from the first direction and includes a first protrusion protruding from one side of the first extension in the first direction and a second protrusion protruding from another side of the first extension in the first direction,
the second multi joint body includes a second extension extending in the second direction and includes a third protrusion protruding from one side of the second extension in the first direction and a fourth protrusion protruding from another side of the second extension in the first direction, and
the first protrusion and the third protrusion are disposed at a lower position than the second protrusion and the fourth protrusion when viewed in the second direction.

16. The electronic device of claim 15, wherein the folding module comprises a hinge holder which includes:
a holder portion coupled to the central joint; and
a protrusion portion protruding from the holder portion in the second direction intersecting the first direction, the protrusion portion coupled to the first hinge.

17. The electronic device of claim 16, wherein the first hinge is rotatably coupled to the protrusion portion.

18. The electronic device of claim 15, wherein
the first hinge is rotatable about a first rotation axis extending in the second direction intersecting the first direction, and
the second hinge is rotatable about a second rotation axis extending in the second direction, the second hinge being spaced apart from the first rotation axis in the first direction.

19. The electronic device of claim 18, wherein
the display panel is folded about a folding axis extending in the second direction,
the first rotation axis and the second rotation axis are spaced apart from each other in the first direction, and
the folding axis is disposed between the first rotation axis and the second rotation axis in a plan view.

20. The electronic device of claim 15, further comprising:
a plate disposed between the display panel and the folding module,
wherein grooves are defined in an area of the plate overlapping the first multi-joint body, the second multi joint body, and the central joint in a plan view.

21. The electronic device of claim 15, wherein the base portion includes a hinge groove that faces away from the joint portion.

* * * * *